A. MAZUR & P. MUDRAK.
NUT LOCK.
APPLICATION FILED APR. 24, 1913.

1,075,218.

Patented Oct. 7, 1913.

Witnesses
M. S. Watson

Inventors
A. Mazur
P. Mudrak
By
Attorneys

COLUMBIA PLANOGRAPH CO., WASHINGTON, D. C.

UNITED STATES PATENT OFFICE.

ANTONY MAZUR AND PAUL MUDRAK, OF NATALIE, PENNSYLVANIA.

NUT-LOCK.

1,075,218.   Specification of Letters Patent.   Patented Oct. 7, 1913.

Application filed April 24, 1913. Serial No. 763,462.

*To all whom it may concern:*

Be it known that we, ANTONY MAZUR and PAUL MUDRAK, citizens of the United States, residing at Natalie, in the county of Northumberland, State of Pennsylvania, have invented certain new and useful Improvements in Nut-Locks; and we do hereby declare the following to be a full, clear, and exact description of the invention, such as will enable others skilled in the art to which it appertains to make and use the same.

The present invention is directed to improvements in nut locks, and has for its object to provide a device of this character so constructed that independent rotation of the bolt and nut is positively prevented.

A further object of the invention is to provide a nut lock which is exceedingly simple in construction, and one which can be easily applied or removed from the bolt, but when in place on the bolt, the likelihood of the same becoming disengaged is eliminated.

With these and other objects in view, this invention resides in the novel features of construction, formation, combination and arrangement of parts to be hereinafter more fully described, claimed and illustrated in the accompanying drawing, in which:—

Figure 1:
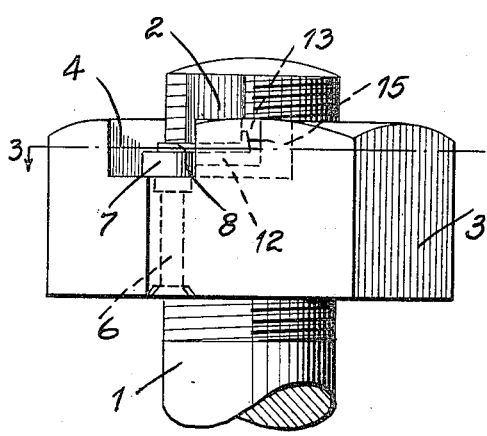
Figure 2:
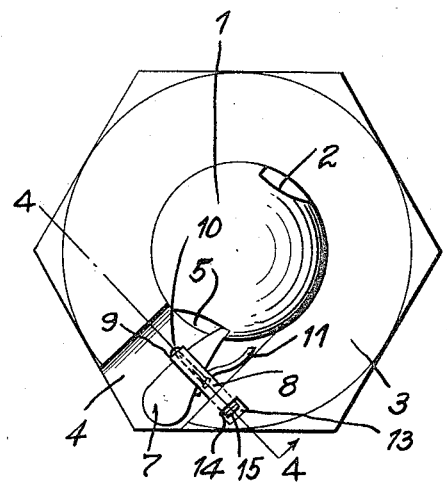
Figure 3:
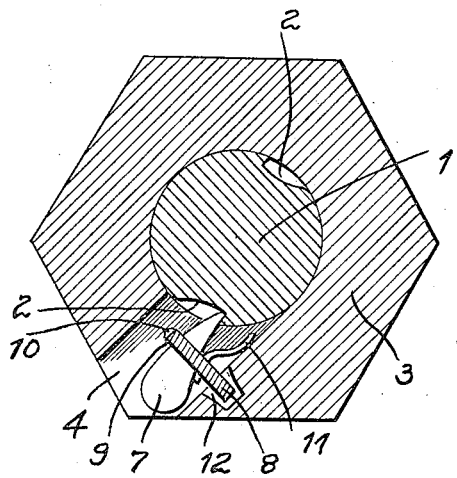
Figure 4:
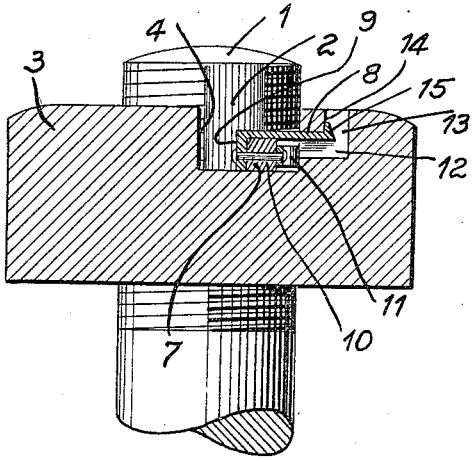

Figure 1 is a side elevation of the device. Fig. 2 is a top plan view. Fig. 3 is a sectional view on line 3—3 of Fig. 1. Fig. 4 is a similar view on line 4—4 of Fig. 2.

Referring to the drawing, the numeral 1 designates a bolt, the same being provided with longitudinal grooves 2, said bolt being engaged by the nut 3. The nut is formed with a recess 4, which extends from the periphery to the bolt opening 5 of the nut. Pivotally connected to the rivet 6 is a pawl 7, the same being adapted for movement in the recess 4 so that the free end thereof may engage either one of the grooves 2 to prevent independent rotation of the nut and bolt. A resilient latch 8 is provided, and has one end formed with a plate 9 which engages one of the side edges of the pawl 7, said plate being connected to the pawl by a pin 10, which also serves to secure one end of the leaf spring 11. The spring 11 is adapted to bear against one side of the recess 4, and tends to force the pawl away from the side when the same is released. Opening into the recess 4 is a bore 12, which has intersecting therewith a bore 13, said bores forming in conjunction a shoulder 14 which is engaged by the hook 15 formed upon the free end of the latch 8, and at which time the pawl is engaged with one of the grooves 2, thus locking the bolt and nut against independent movement.

From this construction it will be seen that the nut can be readily engaged upon the bolt and adjusted with the pawl engaged in one of the grooves 2, and at which time the hook 15 of the latch is engaged with the shoulder 14, thus preventing the pawl from disengaging from the groove. When it is desired to remove the bolt it is only necessary to insert a nail or the like in the bore 13 until the same forces the hook 15 from engagement with the shoulder, whereupon the spring 11 will swing the pawl out of engagement with the groove.

It is apparent that when it is desired to lock the nut that it is only necessary to swing the pawl in one direction until the hook 15 of the latch snaps into engagement with the shoulder 14.

What is claimed is:—

The combination with a bolt having longitudinal grooves formed therein, of a nut thereon having a recess in its outer face, a pawl pivotally connected in the recess, a bore formed in the nut and opening into the recess, a second bore formed in the nut and intersecting with the first named bore to provide a shoulder, a resilient latch connected to the pawl and adapted for operation in the first named bore, a hook carried by the latch and adapted to engage said shoulder to hold the pawl in engagement with one of the grooves of the bolt, and means for swinging the pawl from engagement with the bolt when the hook is disengaged from the shoulder.

In testimony whereof we affix our signatures in the presence of two witnesses.

ANTONY MAZUR.
PAUL MUDRAK.

Witnesses:
F. W. MAGRADY,
H. O. MOSN.

Copies of this patent may be obtained for five cents each, by addressing the "Commissioner of Patents, Washington, D. C."